M. J. SMITH.
VEHICLE SPRING.
APPLICATION FILED MAY 16, 1914.
1,108,479.
Patented Aug. 25, 1914.
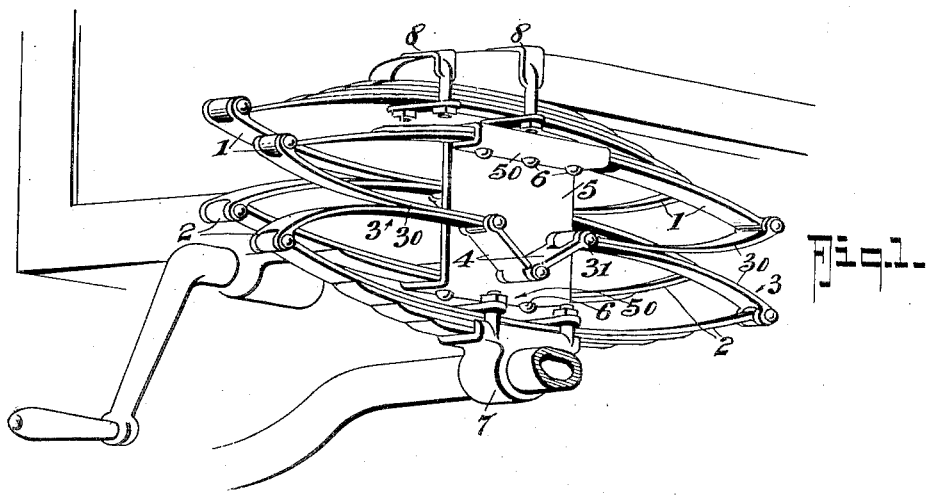
Fig. 1.
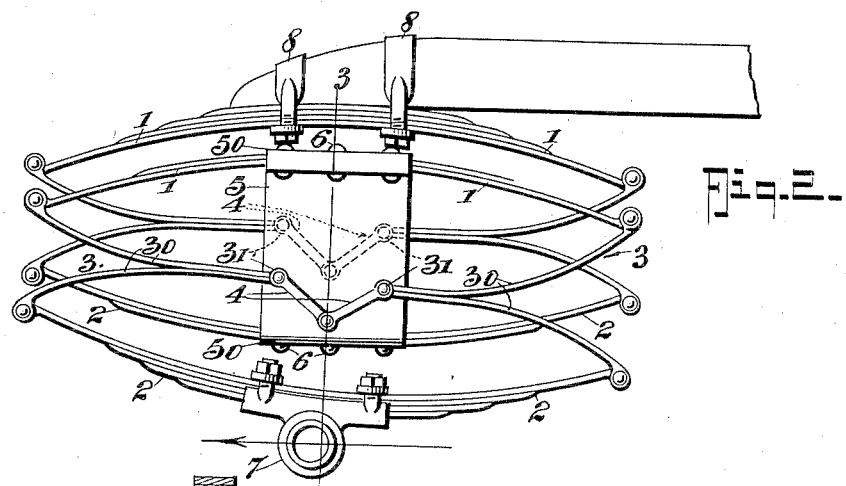
Fig. 2.
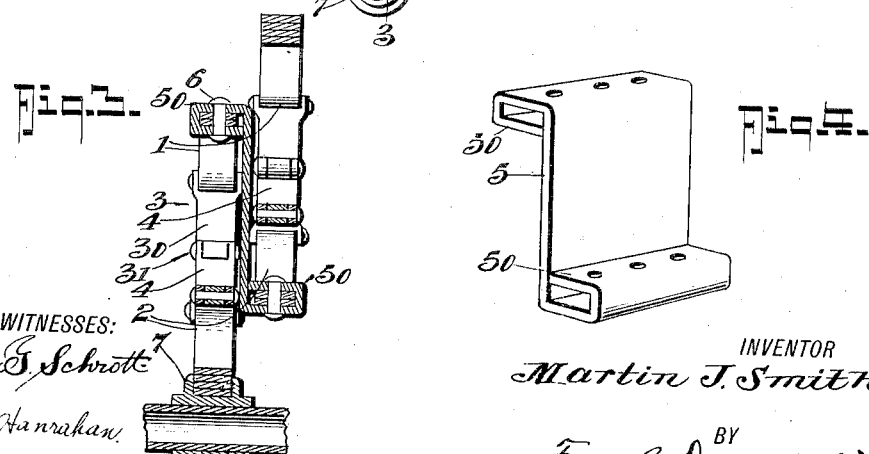
Fig. 3.
Fig. 4.
WITNESSES:
John T. Schrott
Margaret Hanrahan
INVENTOR
Martin J. Smith,
BY
Fred G. Dieterich & Co.
ATTORNEYS.

UNITED STATES PATENT OFFICE.

MARTIN J. SMITH, OF BROCKTON, MASSACHUSETTS.

VEHICLE-SPRING.

1,108,479.

Specification of Letters Patent. Patented Aug. 25, 1914.

Application filed May 16, 1914. Serial No. 838,994.

*To all whom it may concern:*

Be it known that I, MARTIN J. SMITH, residing at Brockton, in the county of Plymouth and State of Massachusetts, have invented a new and Improved Vehicle-Spring, of which the following is a specification.

This invention, which generally relates to improvements in vehicle springs, is more particularly in the nature of a series of spring members so designed and coöperatively arranged, that all the shocks, concussions or jars, from the axle are indirectly transmitted, through the several spring members, and absorbed thereby, before reaching the body of the vehicle.

The primary object of my invention is to provide a vehicle spring of the general type referred to, of a compact, simple and economical construction, in which the parts are so combined that the operation of absorbing the shocks and jars is effectively so accomplished as to allow a motor or other vehicle to ride as easy with solid tires as with inflated ones.

Another object of my invention is to provide an interlocking multiple spring construction, adapted for distributing the shocks or jars over a plurality of grouped spring members or sections, each of which acts to absorb a part of the shock and vibrations imparted from the axle or a preceding group, and to practically absorb all of the said jars or shocks to thereby relieve the body of the vehicle from the ordinary annoyances and discomforts of rough roads, etc.

With other objects in view, that will hereinafter appear, my invention is an improved vehicle spring that embodies the peculiar features of construction and novel arrangement of the parts first described, specifically pointed out in the appended claims and illustrated in the accompanying drawing, in which:

Figure 1 is a perspective view of my improved vehicle spring construction, so much of the vehicle body being shown as necessary to show the practical application of my said spring construction. Fig. 2 is a side elevation of my improved vehicle spring, the several multiple spring sections being diagrammatically shown in the possible relative positions they assume for absorbing the shock or jar, as it is transmitted to the chassis. Fig. 3 is a transverse section of my improved spring construction taken substantially on the line 3—3 on Fig. 2. Fig. 4 is a detail view of the rigid connecting bracket that joins the plurality of sets or sections of the spring members.

In the accompanying drawing, I have shown my improved spring construction as formed of a double set of spring members, but I desire it understood that in the practical application of my invention, the complete spring construction may consist of a triple, quadruple, or greater number of sets of such spring members.

In carrying out my invention, and when arranged as shown in the drawing, the same consists of two sections, each connected to the next by a means locked from the top of one of the said sections to the bottom of the next section, as is clearly shown in Fig. 1 of the drawing. Each set of the spring sections comprises an upper bow spring 1, and a lower bow spring 2, and these are connected at each end, by forked or < shaped springs 3, the members 30—30 of which branch outwardly from the transverse loop or eye portions 31, the said branch members 30 being pivotally joined to the ends of the upper and lower bow springs 1 and 2, as shown, to allow for the vibrations of the said members 30, either in the vertical or longitudinal directions. To effect a uniform motion of the springs 3, of which there is a pair for each of the co-acting upper and lower springs, the adjacent ends of the said springs 3 are joined by the toggle links 4—4.

5 designates a rigid connection or bracket, the detailed construction of which is preferably as shown in Fig. 4, which shows the same as composed of a plate whose ends are bent in opposite directions and upon themselves to form keepers 50—50, the lower one of which receives the lower bow spring 2 of one of the sets of springs, and the upper one the upper bow spring 1 of the next or adjacent set of bow springs, the said spring members being fixedly held in the keepers by rivets 6. The lower one of the set of springs mounted on the axle, is fixedly held thereon by the clip devices 7 and the upper bow spring of the adjacent set of springs is likewise secured to the chassis by clip devices 8. By reason of the peculiar arrangement of each set of springs, and the connections between the said sets of springs, when the bottom spring of the set of springs secured to the axle receives a jar or shock that tends to force the said axle forward, (see arrow on Fig. 2) such shock is transmitted to, and is partly absorbed, by the forked spring connections 3—3 between the upper and lower bow springs mounted upon the axle, the said connections 3 serving, as it were, as a cushioning means for the shock, which is then, in diminished force, communicated to the upper bow spring 1, and through the rigid connection (the bracket 5) to the bottom bow spring of the next set of springs, (the set attached to the chassis or vehicle body) from whence, in a greatly diminished force, the shock is transmitted to the forked spring connections 3—3 that join with the last mentioned bottom bow spring 2 and from the said connections to the upper bow spring that is connected to the chassis, at which point the shock, thus indirectly transmitted from the axle, is practically entirely absorbed. By reason of taking care of the shocks or jars, passing from the axle to the vehicle body, in the manner before stated, the said shocks or jars are intercepted at five different resilient points after taken up by the axle, it being understood that in addition to cushioning the forward and backward shocks the branches of the forked springs also act as cushions for the vertical shocks. The relative size of the bow springs and the forked or connecting springs 3 may be such to suit the special requirements for the vehicles to which my multiple spring members may be applied, but, the connecting bracket or rigid connection between the set of springs is preferably made of a width equal to one-third the length of the bow springs to insure the desired strength.

Among other advantages of my invention, the same provides an exceedingly durable means for the purposes described that may be readily attached to any of the well known types of motor or other vehicles, since the same can be easily applied to such vehicles without any material change in their construction and so mounted that it will serve the combined purpose of a spring and a shock absorber.

What I claim is:

1. A vehicle spring that comprises a plurality of sets of multiple springs, each set consisting of an upper and a lower bow spring, resilient members located between and connected with the said bow springs, and a rigid intermediate connection between each pair of sets of springs, the said connection being fixedly joined with the upper bow springs of one set of springs, and the lower bow spring of the adjacent set of springs.

2. A spring suspension embracing a plurality of sets of multiple spring members having pivotal connections, means for connecting one set of said springs to the vehicle axle, other means for connecting the other set of springs to the vehicle body, and a rigid connection between each adjacent set of springs, said connection being fixedly joined to the upper part of one set of the springs and to the lower part of an adjacent set of springs.

3. A spring suspension embracing two sets of multiple springs, each set including an upper and a lower bow spring member, a pair of forked spring connections, one of said connections having its free end fixedly joined with the adjacent ends of the upper and lower bow springs, the other connection being likewise joined to the adjacent upper and lower ends of the said bow springs, and a rigid connection between the two sets of springs, said connection being joined to the top of one set of springs and to the bottom of the other set of springs.

4. A spring suspension comprising two sets of multiple springs, each including an upper and a lower bow spring member, a pair of forked spring connections, one of the said connections being located between each of the ends of the upper and lower bow springs, means for fixedly connecting the lower bow spring member of one set of springs to the axle other means for connecting the upper bow springs of the upper set to the vehicle body, and further means for keeping the two sets of springs relatively fixedly positioned.

5. A spring suspension comprising two sets of multiple springs, each including an upper and a lower bow spring member, a pair of forked spring connections, one of the said connections being located between each of the ends of the upper and lower bow springs, means for fixedly connecting the lower bow spring member of one set of springs to the axle, other means for connecting the upper bow springs of the upper set to the vehicle body, further means for keeping the two sets of springs relatively fixedly positioned, the said means including a bracket plate located between the two sets of springs whose upper end forms a seat for fixedly holding the upper bow spring of one set of springs and whose lower end forms a seat for holding the lower bow spring of the adjacent set of springs 6. The combination with the vehicle body and the axle; of a set of multiple spring members mounted upon the axle and a like set of members pendently supported from the vehicle body, each set of spring members including an upper and a lower bow spring, a pair of forked spring connections between each set of upper and lower bow spring members, means for flexibly joining the adjacent ends of each of the pairs of spring connections, and a rigid member interposed between each set of springs, the upper end of which connects with the upper bow springs of one set of springs and whose lower end fixedly connects with the lower bow spring of the adjacent set of springs.

7. An interlocking multiple spring for vehicles which comprises in combination with the vehicle body and the axle; a set of spring members which includes an upper and a lower bow spring, the latter being fixedly connected to the axle, another set of spring members including a lower and an upper bow spring, the latter being fixedly and pendently secured on the vehicle body, a rigid member between the two sets of springs whose upper end is fixedly connected to the upper bow spring that is mounted upon the axle and whose lower end is connected to the lower bow spring pendent from the vehicle body, and a forked spring between the opposite ends of each pair of upper and lower bow springs, the said forked springs being pivotally connected to the said end of the bow springs.

8. An interlocking multiple spring for vehicles which comprises in combination with the axle; a set of spring members which includes an upper and a lower bow spring, the latter being fixedly connected to the axle, another set of spring members including a lower and an upper bow spring, the latter being fixedly and pendently secured on the vehicle body, a rigid member between the two sets of springs whose upper end is fixedly connected to the upper bow spring that is mounted upon the axle and whose lower end is connected to the lower bow spring pendent from the vehicle body, a forked spring between the opposite ends of each pair of upper and lower bow springs, the said forked springs being pivotally connected to the said end of the bow springs, and toggle link connections that join the adjacent ends of each set of forked springs.

MARTIN J. SMITH.

Witnesses:
LORING M. BATES,
FRANK A. WHITE.